United States Patent [19]
Ruff et al.

[11] Patent Number: 5,066,472
[45] Date of Patent: Nov. 19, 1991

[54] METHOD FOR PROCESSING THE RESIDUES OF A CHLOROSILANE DISTILLATION

[75] Inventors: Klaus Ruff, Troisdorf; Bernhard Falk, Rheinfelden-Minseln; Werner Grätz, Rheinfelden, all of Fed. Rep. of Germany

[73] Assignee: Huels Aktiengesellschaft, Troisdorf, Fed. Rep. of Germany

[21] Appl. No.: 313,318

[22] Filed: Feb. 17, 1989

Related U.S. Application Data

[63] Continuation of Ser. No. 130,806, Dec. 9, 1987, abandoned.

[30] Foreign Application Priority Data

Dec. 11, 1986 [DE] Fed. Rep. of Germany ....... 3642285

[51] Int. Cl.$^5$ .................... C01B 33/107; C01B 33/08
[52] U.S. Cl. .................................. 423/342; 405/129; 423/343; 423/348; 423/488
[58] Field of Search ............... 423/342, 481, 488, 341, 423/343, 324, 348; 405/129

[56] References Cited

U.S. PATENT DOCUMENTS

| | | | |
|---|---|---|---|
| 3,878,291 | 4/1975 | Keller et al. | 423/343 |
| 4,217,334 | 8/1980 | Weigert et al. | 423/342 |
| 4,340,574 | 7/1982 | Coleman | 423/342 |
| 4,368,181 | 1/1983 | Suzuki et al. | 423/345 |
| 4,490,343 | 12/1984 | Glembin et al. | 423/342 |
| 4,519,999 | 5/1985 | Coleman et al. | 423/342 |

FOREIGN PATENT DOCUMENTS 2161641 10/1973 Fed. Rep. of Germany .

OTHER PUBLICATIONS

Websters Ninth New Collegiate Dictionary, p. 1003.
Elements of Fractional Distillation, Robinson et al., 1950, p. 190.

*Primary Examiner*—Olik Chaudhuri
*Assistant Examiner*—Ken Horton
*Attorney, Agent, or Firm*—Felfe & Lynch

[57] ABSTRACT

Disclosed is a method for the processing of the residues that occur in the production of chlorosilane. The processing is performed by the separation of the residual chlorosilanes, followed by hydrolysis of these residues with water vapor. The water vapor used has a temperature between 100° and 300° C. and additionally contains hydrogen chloride. The hydrolysis residues occurring in the present method have an extremely small chloride content and can be transported, if desired, directly to a dump. The hydrogen chloride that is released can be absorbed in water and removed as hydrochloric acid or can be desorbed for further technical use. Preferably it is reused for chlorosilane production.

8 Claims, No Drawings

METHOD FOR PROCESSING THE RESIDUES OF A CHLOROSILANE DISTILLATION

This application is a continuation, of application Ser. No. 130,806, filed Dec. 9, 1987, now abandoned.

BACKGROUND OF THE INVENTION

The present invention is in a method for separating the residue obtained in the distillation of chlorosilanes from the other chlorosilanes, processing the residues to obtain a very complete hydrolysis of the residues and obtaining reusable hydrogen chloride.

The residues to be processed according to the invention occur in the production of chlorosilanes. Chlorosilanes are prepared by the reaction of chlorine or hydrogen chloride with raw silicon. Industrially, raw types of silicon having silicon contents of 85% and more, are usually used for this purpose. Other components of the raw silicon are mainly iron and aluminum. In the chlorination or hydrochlorination, the silicon and metals contained in the raw silicon are converted to chlorides and occur in granular form as byproducts. In addition to these metal chlorides, high-boiling components, such as titanium tetrachloride, hexachlorodisiloxane or pentachlorodisiloxane, also occur as byproducts in the production of chlorosilane.

The chlorosilanes are usually roughly separated from the solid residues by distillation, leaving as residue a suspension that requires separate processing. Reaction of this residue with water transforms the chlorosilanes contained in the residue to silicic acid and the metal chlorides to metal oxides or hydroxides, and releases hydrogen chloride in the form of hydrochloric acid. Disadvantages of this process include the loss of chlorosilane product and the formation of a hydrochloric acid containing solution of metal salts and silicic acid which must be disposed of.

DE-AS 21 61 641 discloses transferring the distillation residue into a mixer, distilling out the chlorosilanes to obtain a residue low in chlorosilane and treating it with steam. The distilled off hydrogen chloride is fed to an absorption process and the hydrolysis residue is removed dry. A disadvantage of that process is that by the addition of a small amount of steam, one obtains a highly concentrated hydrogen chloride, but an incompletely hydrolyzed residue which still contains a considerable residual chlorine content requiring further processing. If a large amount of steam is added, the residual chlorine content in the residue is low, but the distilled out hydrogen chloride contains excess water vapor. Since the formation of the azeotrope makes complete separation of hydrogen chloride and water impossible, the water fed to the following separation in the recovery of hydrogen chloride has to be let out as hydrochloric acid. This hydrochloric acid is no longer usable in the production process in question and constitutes an industrial product of lesser value, while the hydrogen chloride it contains can be used in an isolated form.

Another disadvantage of this process is that the drying and hydrolysis takes place in the same apparatus. Graded temperatures must be used to prevent aluminum chloride from issuing at the top of this apparatus. The drying is performed at low temperatures and the hydrolysis at high temperatures. Thus the process becomes laborious.

The problem therefore existed of finding a method for processing the distillation residues with the recovery of chlorosilanes and hydrogen chloride, capable of delivering a hydrolysis residue suitably low in chlorides so it may be dumped, while permitting a maximum recovery of hydrogen chloride. Further the recovered hydrogen chloride should be of such a purity that it can be directly reused, e.g., in the present process. Further production of additional hydrochloric acid should be prevented because its economical disposal is difficult.

SUMMARY OF THE INVENTION

The above-stated objectives and others are obtainable in the process of the invention.

The present invention is in a method for processing residues to recover chlorosilanes and hydrogen chloride by processing those bottom product residues occurring in the distillation of the chlorosilanes obtained in the chlorination or hydrochlorination of silicon. The residue remaining after separation of the chlorosilanes is subjected to hydrolysis with water vapor at 100° to 300° C. in the presence of additional hydrogen chloride in amounts of between 10 and 40% of the weight of the input mixture of water and hydrogen chloride.

The amount of steam added determines the degree of hydrolysis of the metal chlorides. For complete hydrolysis of the metal chlorides, at least as much water vapor is added as is necessary for the formation of the corresponding metal oxides. In practice, therefore, the amount of water vapor that is used will be equal to at least four-tenths, by weight, of the amount of the distillation residue. Preferably the ratio by weight of the input water vapor to the residue will be between 1:1 and 5:1. The addition of lesser amounts of water vapor is also possible, especially when a higher chloride content in the hydrolysis residue, i.e., over 15 to 20%, is desired and can be tolerated. When the preferred amount of water vapor is added, the residue has a chloride content of between 3 and 7%.

In order to achieve low chloride levels in the hydrolysis residue, an amount of water vapor, substantially above the stoichiometric minimum, must be added so that a large part of the input water vapor remains unreacted. It has now been found that an additional amount of hydrogen chloride does not interfere in the hydrolysis. Thus, the process can be conducted so that only the amount of water reacted by hydrolysis is added, while the water excess necessary for a low chloride content in the hydrolysis residue is recirculated in the form of a mixture of water and hydrogen chloride. The hydrogen chloride content in a mixture which consists of added water and the recirculated mixture of water and hydrogen chloride, is to amount, in accordance with the invention, to from 10 to 40% by weight of the whole mixture.

The added water can be delivered also in the form of a mixture of hydrogen chloride and water, in which case this mixture is concentrated in a desirable manner as a result of the hydrolysis reaction, and this is to be considered as an economical advantage.

Prior to the hydrolysis of the chloride-containing residue, it is economical to perform an additional, yet not absolutely complete, separation of chlorosilanes and to return them to the production process. The residue solids content of originally about 40% according to the previously known processes, will thus increase to more than 80% and preferably more than 90%. The additional separation of chlorosilanes can be performed continuously at temperatures between 50° and 160° C. while operating in a screw-apparatus, a double screw device preferably. This embodiment has the advantage that the drying of the residue can be performed advantageously with regard to the aluminum chloride which must be restrained from the evaporated chlorosilanes.

The hydrolysis is then performed in a second step, preferably in another apparatus, at a higher temperature, which can be approximately between 100° and 300° C. Thus a better yield per unit time per unit of capacity is obtained on account of the higher possible starting temperature during the hydrolysis and a higher operating security against the danger of sublimation of aluminum chloride in the drying of the residue obtained.

EXAMPLE AS STANDARD FOR COMPARISON

A mixture of trichlorosilane and silicon tetrachloride, which had been obtained by the fluid-bed hydrochlorination of raw silicon, was distilled and produced a residue. That residue was dried in a double screw at 130° C. until it had a moisture content of about 10% and a chloride content of 70%. Of this pre-dried residue 150 kg was treated in a mixer with a flow of steam of 300 kg/h at a temperature of 170° C. for 18 minutes.

The gases withdrawn from the mixture consisted of 44.5 kg of water vapor and 93.5 kg of hydrogen chloride. These gases were fed to an absorption/desorption unit in which 69.6 kg of hydrogen chloride were desorbed and a hydrochloric acid of 35 wt.-% hydrogen chloride was obtained in a quantity of 68.3 kg. The hydrogen chloride was reused in the production process for chlorosilanes, whereas the hydrochloric acid had to be separated from the process. At the end of the above-stated hydrolysis period, the residue had a chloride content of 14%.

By increasing the hydrolysis period to 60 minutes under otherwise the same conditions the chloride content of the hydrolysis residue could be reduced to 8.5%. No hydrogen chloride was desorbed, and the 315.0 kg of hydrochloric acid removed from the plant had a hydrogen chloride content of 28.4 wt.-%.

By further increasing the hydrolysis to 150 minutes, the chloride content of the residue was reduced to 4%. 803.4 kg of a 13% hydrochloric acid was withdrawn from the absorption apparatus.

EXAMPLE 1

The same distillation residue as in the above Comparison Example was reacted by the method of the invention. For a period of 18 minutes, 150 kg of the pre-dried residue was treated with a stream of 152.1 kg/h of steam at a temperature of 170° C. to which 185.8 kg/h of a mixture of hydrogen chloride and water vapor, corresponding to an azeotropic composition of hydrochloric acid of 20.4 wt.-% of hydrogen chloride, was added. The gases withdrawn from the mixer contained 44.4 kg of water vapor and 104.9 kg of hydrogen chloride. These gases were fed to an absorption/desorption unit in which 93.5 kg of hydrogen chloride was desorbed and 55.7 kg of azeotropic hydrochloric acid was produced, which was recycled to the hydrolysis. At the end of the above-stated hydrolysis period the residue had a chloride content of 14%.

A chloride content of 8.5% was obtained in the residue at a hydrolysis time of 60 minutes when, under the same conditions, the residue was treated with 48.6 kg/h of steam and with 315.8 kg/h of a mixture of hydrogen chloride and water vapor corresponding to an azeotropic composition of hydrochloric acid. 99.6 kg of hydrogen chloride was withdrawn from the desorber, and azeotropic hydrochloric acid in the amount of 315.8 kg was recycled to the hydrolysis.

To obtain a residual chlorine content of 4%, a pre-dried residue was treated for 150 minutes under the above conditions with 20.4 kg/h of steam and 351.3 kg/h of gaseous azeotropic hydrochloric acid. 104.3 kg of hydrogen chloride was obtained from the desorption, plus 878.3 kg of azeotropic hydrochloric acid which again was recycled to the hydrolysis.

EXAMPLE 2

As in Example 1, a distillation residue from the production of tetrachlorosilane was processed which had been obtained by the chlorination of raw silicon in a fixed-bed reactor. The residue used had a chloride content of 65% and contained 7% moisture (in the form of silicon tetrachloride and chlorosiloxanes).

150 kg of this residue was used for the hydrolysis. The steam had a temperature of 240° C. and flowed at the rate of 78.4 kg/h into the mixer. It contained admixed with it 278.5 kg/h of a gaseous mixture of hydrogen chloride and water vapor corresponding to an azeotropic composition of hydrochloric acid containing 20.4 wt.-% of hydrogen chloride.

At the end of 18 minutes under the above-named hydrolysis conditions the residue had a chloride content of 23%. 79.0 kg of hydrogen chloride was withdrawn from the desorber and 83.6 kg of azeotropic hydrochloric acid was obtained, which was recycled into the hydrolysis.

Under the same conditions as before, a chloride content of 10% was obtained in the residue at a hydrolysis time of 60 minutes when 150 kg of pre-dried chlorination residue was treated with 26.1 kg/h of steam and 344.1 kg/h of an azeotropic mixture of steam and hydrogen chloride. 89.4 kg of hydrogen chloride was obtained from the desorber, plus 344.1 kg of azeotropic hydrochloric acid, which was recycled.

To obtain a chloride content of 7% in the residue, the hydrolysis was performed under the same conditions for 150 minutes with 11.0 kg/h of steam and 363.1 kg/h of an azeotropic mixture of hydrogen chloride and steam. 95.1 kg of hydrogen chloride was removed from the desorber, while 907.7 kg of azeotropic hydrochloric acid was recycled to the hydrolysis.

It will be understood that the specification and examples are illustrative but not limitative of the present invention and that other embodiments within the spirit and scope of the invention will suggest themselves to those skilled in the art.

We claim:

1. A method for processing a chlorosilane containing residue produced as bottom product after the distillation of chlorosilanes from hydrochlorination or chlorination of silicon to recover the chlorosilanes and hydrogen chloride comprising: separating the chlorosilanes contained in the residue; treating the remaining residue with water vapor at a temperature of 100° to 300° C. in the presence of additional hydrogen chloride in amounts of 10 to 40 wt.-% with respect to the hydrogen chloride and water mixture; and recovering hydrogen chloride from a resulting gaseous mixture.

2. The method of claim 1 wherein the chlorosilane is continuously separated.

3. The method of claim 1 wherein the chlorosilane is separated at a temperature of from 50° to 160° C.

4. The method of claim 3 wherein the separation is performed by evaporation in a screw apparatus.

5. The method of claim 4 wherein the screw apparatus is a double screw.

6. The method of claim 1 wherein an amount of chlorosilane is separated from the residue such that the remaining solids content of the residue before hydrolysis amounts to between 70 and 95%.

7. The method of claim 6 wherein the remaining solids content of the residue before hydrolysis is between 80 and 95%.

8. A method for processing a chlorosilane containing residue produced after the distillation of chlorosilanes from hydrochlorination or chlorination of silicon to recover the chlorosilanes and hydrogen chloride comprising: separating the chlorosilanes contained in the residue; treating the remaining residue with water vapor at a temperature of 100° to 300° C. in the presence of additional hydrogen chloride in amounts of 10 to 40 wt.-% with respect to the hydrogen chloride and water mixture; and recovering hydrogen chloride from a resulting gaseous mixture.

* * * * *